(12) United States Patent
Naito

(10) Patent No.: US 9,060,073 B2
(45) Date of Patent: Jun. 16, 2015

(54) FACSIMILE APPARATUS, CONTROL METHOD THEREOF, AND STORAGE MEDIUM

(71) Applicant: CANON KABUSHIKI KAISHA, Tokyo (JP)

(72) Inventor: Yosui Naito, Kawasaki (JP)

(73) Assignee: CANNON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/761,852

(22) Filed: Feb. 7, 2013

(65) Prior Publication Data
US 2013/0216031 A1    Aug. 22, 2013

(30) Foreign Application Priority Data
Feb. 16, 2012    (JP) .................................. 2012-032038

(51) Int. Cl.
*H04M 11/00*    (2006.01)
*H04M 11/06*    (2006.01)

(52) U.S. Cl.
CPC ............ *H04M 11/00* (2013.01); *H04M 11/066* (2013.01)

(58) Field of Classification Search
CPC .......... H04N 1/32704; H04N 1/32708; H04N 1/32719; H04N 1/32728; H04N 1/3271; H04N 1/32747
USPC ............... 379/100.01, 100.15, 100.16, 93.09; 358/434–438
See application file for complete search history.

(56) References Cited

U.S. PATENT DOCUMENTS

| | | | | |
|---|---|---|---|---|
| 4,794,637 A * | 12/1988 | Hashimoto | .............. | 379/100.16 |
| 4,974,253 A | 11/1990 | Hashimoto | .................... | 379/100 |
| 5,077,786 A * | 12/1991 | Hashimoto | .............. | 379/100.16 |
| 5,444,771 A * | 8/1995 | Ohnishi | ................... | 379/100.16 |
| 5,909,288 A * | 6/1999 | Kawamura | .................... | 358/468 |
| 6,654,148 B2 | 11/2003 | Nishii | | |
| 7,688,956 B2 * | 3/2010 | Norris et al. | ............. | 379/100.16 |

FOREIGN PATENT DOCUMENTS

JP    11-032192 A    2/1999

OTHER PUBLICATIONS

Chinese Office Action dated Feb. 2, 2015 in counterpart Chinese Patent Application No. 201310049469.X, together with an English language translation.

* cited by examiner

*Primary Examiner* — Stella Woo
(74) *Attorney, Agent, or Firm* — Fitzpatrick, Cella, Harper & Scinto

(57) ABSTRACT

After a telephone captures a line, a facsimile apparatus detects a tone signal on the captured line. The facsimile apparatus counts a number of the detected tone signals. When the counted number reaches a predetermined number, the facsimile apparatus controls to start a facsimile reception. The facsimile apparatus detects a change of a hook state of the telephone. When the change of the hook state of the telephone is detected, the facsimile apparatus resets the counted number.

13 Claims, 4 Drawing Sheets

FACSIMILE APPARATUS, CONTROL METHOD THEREOF, AND STORAGE MEDIUM

BACKGROUND OF THE INVENTION

1. Field of the Invention

The present invention relates to a facsimile apparatus, to which a telephone can be connected, a control method thereof, and a storage medium.

2. Description of the Related Art

A facsimile apparatus, which can connect a telephone, has an automatic switching function between FAX reception and an operation of the telephone upon reception of an incoming call. This function is classified into two types depending on whether a telephone to be connected has a telephone answering function. One type is "FAX/telephone answering automatic switching" in case of a telephone with a telephone answering function. With this function, while an answering telephone performs automatic answering upon reception of an incoming call, the facsimile apparatus monitors a telephone line using a modem, and starts FAX reception if a FAX incoming call is detected. The other type is "FAX/TEL automatic switching" in case of a telephone without any telephone answering function. With this function, the facsimile apparatus responds upon reception of an incoming call, and causes a telephone to ring so as to call for the user, similarly monitors a telephone line using a modem, and starts FAX reception if a FAX incoming call is detected.

In either case, in order to judge FAX reception by monitoring the telephone line, a tone signal called a calling signal (CNG), which is output from the transmitting device side at the time of FAX transmission is used. The facsimile apparatus can detect the CNG by the modem, and can judge that a partner is not a person but a FAX when this CNG is detected. Therefore, in order to automatically switch between a telephone operation and FAX reception without any malfunction, it is impermissible to erroneously detect the CNG. Japanese Patent Laid-Open No. 11-32192 has proposed a method of preventing misrecognition of a human voice (speech) as the CNG by checking a frequency or cadence. With this method, patent literature 1 prevents a 1100-Hz component which is included in speech and is the same as the CNG from being misrecognized as the CNG.

However, the aforementioned related art suffers problems to be described below. For example, when the FAX/telephone answering automatic switching function is set, the user may off-hook a receiver of the answering telephone simultaneously with an incoming call or may unintentionally off-hook the receiver during telephone answering when a loudspeaker of the answering telephone is OFF. At this time, when the user executes pulse-dialing to originate a call, noise is generated by pulse-dialing on a telephone line, and the facsimile apparatus misrecognizes that noise as the CNG to automatically start FAX reception.

In the "FAX/TEL automatic switching" function, an outgoing message (OGM) like "Now calling. Please wait" is often output onto a telephone line so as to inform a caller of calling when the partner side is a person. This OGM is output not by the telephone but by the facsimile apparatus. That is, since the OGM is controlled on the facsimile apparatus side, an output timing of the OGM onto the telephone line can be detected. On the other hand, in the "FAX/telephone answering automatic switching" function, the answering telephone outputs the OGM for telephone answering onto a telephone line. For this reason, the facsimile apparatus cannot detect the OGM output timing onto a line. Therefore, the facsimile apparatus has to detect even the CNG which is output to be superposed on the OGM. Under such conditions, when the CNG misrecognition prevention method of the related art is used, the CNG detectability is considerably impaired.

SUMMARY OF THE INVENTION

The present invention enables realization of a facsimile apparatus which can prevent misrecognition of noise generated by pulse-dialing as a CNG without lowering the CNG detection performance in an environment in which an OGM is output onto a telephone line during FAX/telephone answering automatic switching, a control method thereof, and a storage medium.

One aspect of the present invention provides a facsimile apparatus comprising: a connecting unit configured to connect a telephone; a tone detecting unit configured to detect, after the telephone captures a line, a tone signal on the captured line; a counting unit configured to count a number of the tone signals detected by the tone detecting unit; a controlling unit configured to control to start a facsimile reception, when the number counted by the counting unit reaches a predetermined number; a hook detecting unit configured to detect a change of a hook state of the telephone; and a resetting unit configured to reset the number counted by the counting unit, when the hook detecting unit detects the change of the hook state of the telephone.

Another aspect of the present invention provides a facsimile apparatus comprising: a connecting unit configured to connect a telephone; a tone detecting unit configured to detect, after the telephone captures a line, a tone signal on the captured line; a controlling unit configured to control to start a facsimile reception, when the tone detecting unit detects the tone signal; and a hook detecting unit configured to detect a change of a hook state of the telephone, wherein the controlling unit does not control to start the facsimile reception, when the hook detecting unit detects the change of the hook state of the telephone.

Still another aspect of the present invention provides a control method of a facsimile apparatus having a connecting unit configured to connect a telephone comprising: detecting, after the telephone captures a line, a tone signal on the captured line; counting a number of the detected tone signals; controlling to start a facsimile reception, when the counted number reaches a predetermined number; detecting a change of a hook state of the telephone; and resetting the counted number, when the change of the hook state of the telephone is detected.

Yet still another aspect of the present invention provides a control method of a facsimile apparatus having a connecting unit configured to connect a telephone comprising: detecting, after the telephone captures a line, a tone signal on the captured line; controlling to start a facsimile reception, when the tone signal is detected; and detecting a change of a hook state of the telephone, wherein the facsimile reception is not controlled to start, when the change of the hook state of the telephone is detected.

Still yet another aspect of the present invention provides a non-transitory computer readable storage medium storing a program for causing a computer to execute the control method of the facsimile apparatus.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Arrangement of Facsimile Apparatus>

Figure 1:
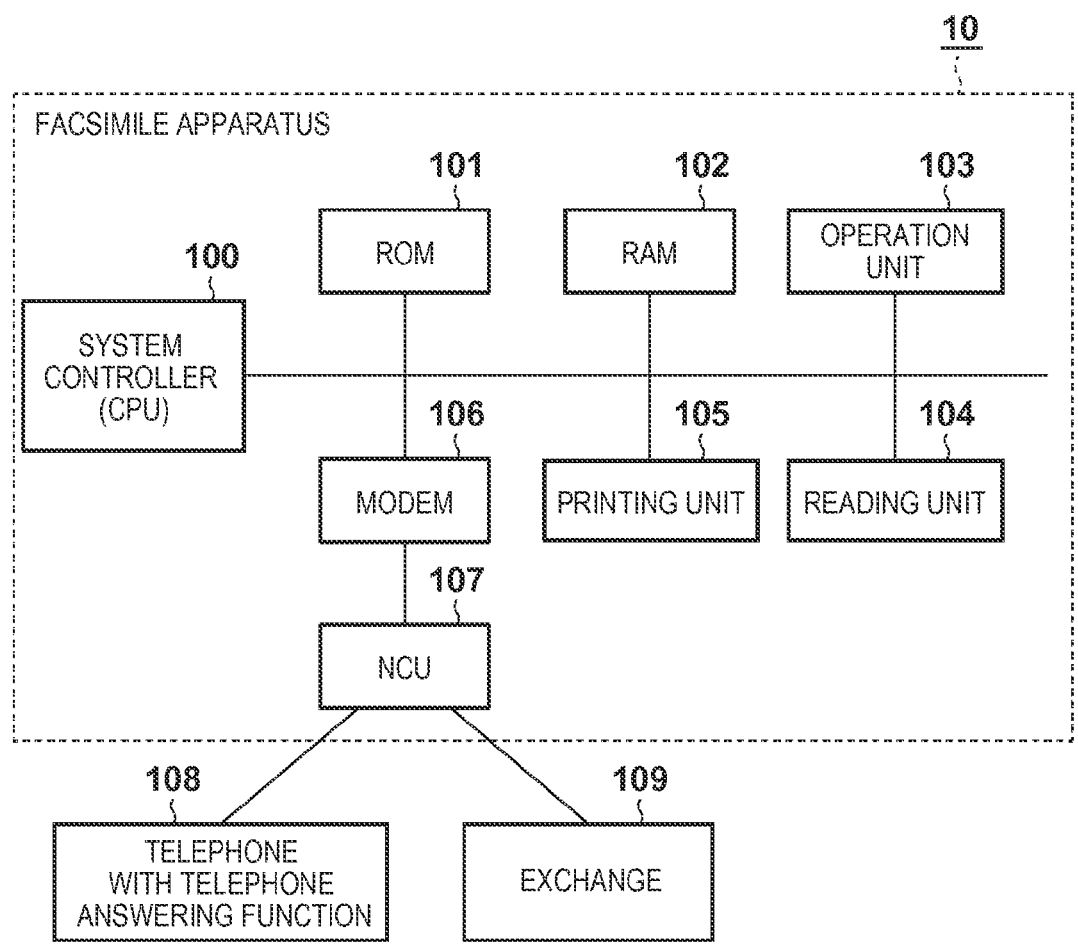
FIG. 1 is a block diagram showing an example of the arrangement of a facsimile apparatus according to one embodiment.

An example of the arrangement of a facsimile apparatus 10 according to this embodiment will be described first with reference to FIG. 1. The facsimile apparatus 10 includes a system controller (to be referred to as a CPU hereinafter) 100, ROM 101, RAM 102, operation unit 103, reading unit 104, printing unit 105, modem 106, NCU 107, telephone 108 with a telephone answering function, and exchange 109.

The CPU 100 systematically controls the overall apparatus by executing a control program stored in the ROM 101. The ROM 101 stores the control program of the CPU 100. The RAM 102 includes a DRAM or the like, and stores image data. The operation unit 103 includes a keyboard, display unit, and the like, and allows the operator to make various input operations.

The reading unit 104 reads a document, and outputs digital data. The printing unit 105 includes a printer such as an LBP which prints a received image on a plain paper sheet. The modem 106 demodulates a modulated signal from a telephone line. Also, the modem 106 modulates a signal from the apparatus, and outputs the modulated signal onto the telephone line. The NCU (Network Control Unit) 107 serves as an interface between the telephone line and FAX. The NCU 107 detects a signal coming from the telephone line and supplies the detected signal to the modem. Also, the NCU 107 executes line control for switching the telephone line between the FAX and telephone.

The telephone 108 with the telephone answering function automatically outputs an outgoing message (OGM) upon reception of an incoming call without requiring any operation by the operator. The telephone 108 is connected to the exchange 109 via the NCU 107. The exchange 109 switches connections between transmission paths in response to a request from a caller to establish a communication line in multi-to-multi electric communications.

The operation upon reception of an incoming call will be described below. The facsimile apparatus 10 has a function of executing automatic switching between facsimile reception (to be abbreviated as FAX reception hereinafter) and an operation of the telephone. This function is classified into a FAX/telephone answering automatic switching function with the telephone answering function, and a FAX/TEL automatic switching function without any telephone answering function. The facsimile apparatus 10 has the FAX/TEL automatic switching function.

The facsimile apparatus 10 judges FAX reception upon reception of an incoming call by checking whether or not a calling signal (CNG) output from the transmitting device side at the time of FAX transmission is detected. However, in the FAX/telephone answering automatic switching function, when the user off-hooks a receiver of the telephone 108 with the telephone answering function simultaneously with an incoming call, and executes pulse-dialing to originate a call, noise is generated on the telephone line due to the pulse-dialing, and is unwantedly misrecognized as the CNG.

The CNG is an intermittent tone signal having a frequency of 1100 Hz, and has a 0.5 s (ON)-3.0 s (OFF) cadence. The reason why the noise generated by the pulse-dialing is misrecognized as the CNG is that since an intermittent waveform of the pulse-dialing is a rectangular wave, it includes many high-frequency components, which include a 1100-Hz component equal to the frequency of the CNG. In addition, when a digit number "5" is dialed at 10 PPS, a duration of the intermittent waveform of the pulse-dialing is just about 0.5 s, and is equal to an ON time of the CNG, thus readily causing misrecognition.

In order to prevent such misrecognition, the related art adopts the following judgment method. For example, when other frequencies are detected simultaneously with 1100 Hz as the frequency of the CNG, noise or speech is judged, and it is determined that the CNG is not detected. When a tone signal which does not match the 0.5 s (ON)-3.0 s (OFF) cadence of the CNG is detected, it is determined that the CNG is not detected. These methods are effective for noise generated by the pulse-dialing. However, these methods can be used in the FAX/TEL automatic switching function, but they cannot be used in the FAX/telephone answering automatic switching function. This is because CNG detection can be made during an interval in which no speech is output onto the telephone line in the FAX/TEL automatic switching function, while a speech output timing onto the telephone line is unknown in the FAX/telephone answering automatic switching function.

That is, in the FAX/telephone answering automatic switching function, the CNG superposed on speech has to be detectable, and the frequency/cadence checking disturbs the CNG detection for this purpose. When the CNG is superposed on speech, and when frequencies other than 1100 Hz are detected, if it is determined that the CNG is not detected, the CNG cannot always be detected under this condition. Also, since speech includes a 1100-Hz component, it is difficult to accurately observe OFF times of the CNG.

Note that in the FAX/TEL automatic switching function, when the partner side is a person, an outgoing message (OGM) like "Now calling. Please wait" is often output onto the telephone line so as to inform the caller of calling. When the FAX/TEL automatic switching function is set, the OGM is output not by the telephone but by the facsimile apparatus. That is, since the facsimile apparatus side controls the OGM, the output timing of the OGM onto the telephone line can be detected. Therefore, the facsimile apparatus can make the CNG detection during a non-output interval of the OGM (during an interval free from any noise of the OGM). When the partner side is a person, the speech uttered by the person is output onto the telephone line during the non-output interval of the OGM. However, in this case, since the CNG is not output, speech and the CNG are never output together in any case.

On the other hand, like in the facsimile apparatus 10 of this embodiment, the telephone 108 with the telephone answering function outputs the OGM for telephone answering onto the telephone line when the FAX/telephone answering automatic switching function is set. Hence, this OGM cannot be controlled by the facsimile apparatus 10. For this reason, the facsimile apparatus 10 cannot detect an output timing of the OGM onto the line. Therefore, the facsimile apparatus 10 according to this embodiment is configured to detect even the CNG which is output while being superposed on the OGM.

<Arrangement of NCU>

Figure 2:
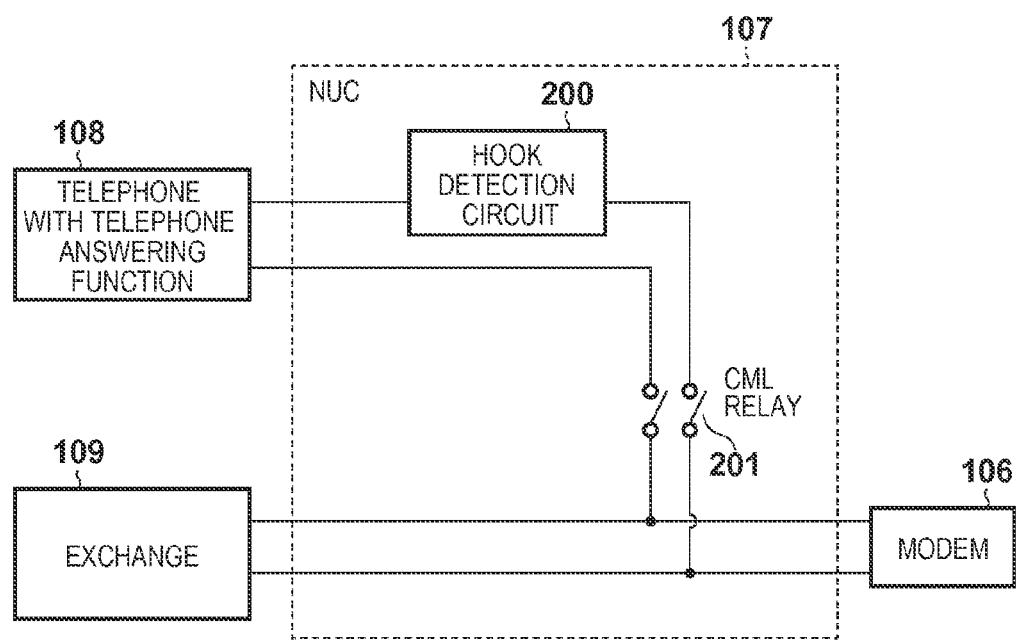
FIG. 2 is a block diagram showing an example of the internal arrangement of an NCU 107.

The internal arrangement of the NCU 107 will be described below with reference to FIG. 2. The NCU 107 includes a hook detection circuit 200 and CML relay 201. The hook detection circuit 200 detects a line current which is output when the receiver of the connected telephone is off-hooked, thus allowing a hook state of the receiver to be detected. When pulse-dialing is executed at the receiver, since the line current is intermittently output, this circuit can detect the hook state. The CML relay 201 is used to connect or disconnect the telephone line connected to the exchange 109 to or from the telephone 108 with the telephone answering function. During a standby state and telephone answering when the FAX/telephone answering automatic switching function is set, the CML relay 201 is switched to connect the telephone 108 with the telephone answering function to the telephone line. After that, when FAX reception is to be started, the CML relay 201 is switched to disconnect the telephone 108 with the telephone answering function from the telephone line.

<CNG Detection>

Figure 4:
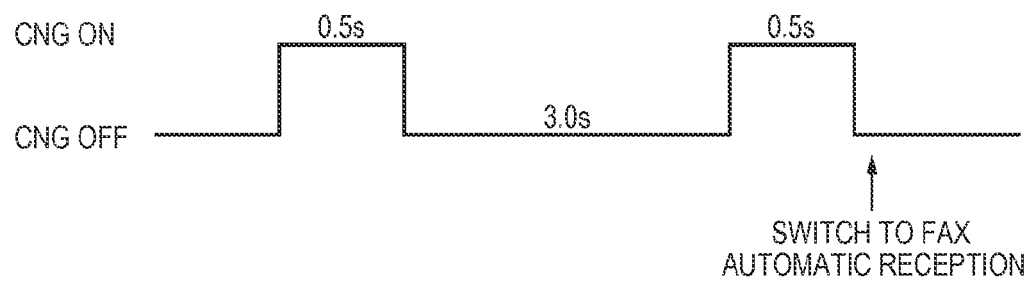
FIG. 4 is a timing chart showing a CNG detection settlement timing according to the embodiment.

A CNG detection settlement timing in this embodiment will be described below with reference to FIG. 4. The CNG is a pattern which includes a 0.5-s 1100-Hz output period followed by a 3.0-s silent period, and is a signal which repeats this ON time and OFF time. The facsimile apparatus 10 according to this embodiment performs automatic switching when the CNG pattern is detected not once but twice, so as to prevent unwanted automatic switching at the time of FAX/telephone answering automatic switching. As described above, in the FAX/telephone answering automatic switching function, since it is difficult to correctly detect an OFF time of the CNG, only an ON time is checked. When an ON time within a prescribed range is found, it is determined that one CNG is detected. Note that the number of CNG patterns to be detected and the detection method are examples, and do not limit the present invention. These number and method are used in control required to assure the CNG detection reliability. For example, these number and method may be designed to detect a plurality of patterns depending on individual installation environments and the like.

<Processing Sequence>

Figure 3:
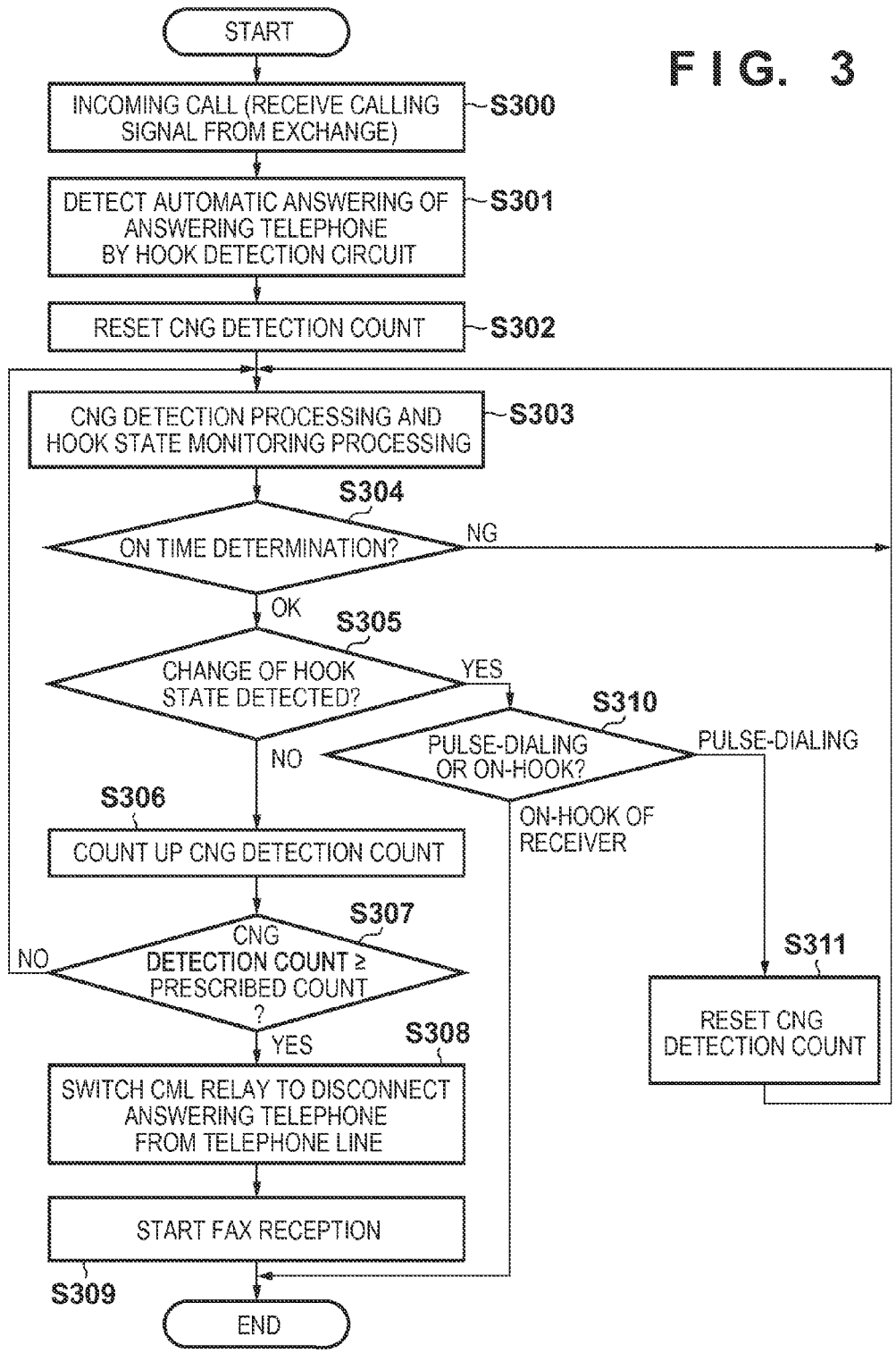
FIG. 3 is a flowchart showing the processing sequence of the facsimile apparatus according to the embodiment.

The processing sequence of the FAX/telephone answering automatic switching function executed by the facsimile apparatus 10 of this embodiment will be described below with reference to FIG. 3. The processing to be described below is implemented when the CPU 100 reads out the control program stored in the ROM 101 onto the RAM 102 and executes the readout program. In this case, a pulse-dialing execution detection state during automatic switching processing and a method of resetting a CNG detection count upon detection of the pulse-dialing execution will be described below.

When a calling signal is received from the exchange 109 in step S300, the telephone 108 with the telephone answering function automatically captures the telephone line, and starts telephone answering (automatic answering). In step S301, the CPU 100 detects using the hook detection circuit 200 that the telephone line is captured in step S300. After that, in step S302, the CPU 100 resets a CNG detection count (counter) so as to start CNG detection. This counter is assured on a memory such as the RAM 102.

Next, in step S303, the CPU 100 acquires tone detection information notified from the modem 106, which detects a tone signal, and analyzes a pattern in the tone detection information to calculate an ON time of a signal that appears as the CNG included in the tone signal. Assume that the ON time is a time since a detection timing of a tone signal including a frequency component of 1100 Hz from the modem 106 until that of silence of a prescribed time or more. Furthermore, simultaneously with the CNG detection processing, the CPU 100 refers to the hook detection circuit 200 to monitor the hook state. This is to detect the pulse-dialing executed by the telephone 108 with the telephone answering function.

After the ON time is settled, the CPU 100 determines the ON time in step S304. If the ON time falls outside the prescribed range, the process returns to step S303 to continue the CNG detection. If the ON time falls within the prescribed range, the process advances to step S305, and the CPU 100 determines a change of the hook state. This determination is made based on the result of the hook state monitoring processing in step S303, and if the hook state has not changed, it is judged that the detected CNG is valid. The process then advances to step S306, and the CPU 100 counts up a detection count. After that, the CPU 100 determines in step S307 whether or not the CNG detection count has reached a prescribed count (predetermined count) or more. If the CNG detection count has reached the prescribed count or more, the process advances to step S308, and the CPU 100 switches the CML relay 201 to disconnect the telephone 108 with the telephone answering function from the telephone line. In step S309, the CPU 100 starts FAX automatic reception, thus ending the processing.

On the other hand, if the CPU 100 determines in step S305 that the hook state has changed, the process advances to step S310, and the CPU 100 determines whether the change of the hook state is caused by off-hooking of the receiver or execution of the pulse-dialing. In the hook state monitoring processing, when a duration time since detection of a change to an on-hook state is a prescribed time or longer, the CPU 100 determines that the user on-hooks the receiver. In this case, the CPU 100 ends the processing by skipping the subsequent processes. That is, the CPU 100 ends the CNG detection (count). Otherwise, if the CPU 100 determines that the on-hook state is shorter than the prescribed time, it determines that the pulse-dialing is executed. Then, the process advances to step S311, and the CPU 100 resets the CNG detection count. After that, the process returns to step S303 to continue the CNG detection processing. This is to judge that the pulse-dialing is erroneously detected as the currently detected CNG. That is, the erroneously detected CNG detection count is reset to execute the detection again.

As described above, whether or not the pulse-dialing is executed during the CNG detection processing is checked, and if the pulse-dialing is executed, the CNG detection count is reset to prevent the FAX reception from being unwantedly started. According to this embodiment, misrecognition of the CNG due to noise generated by the pulse-dialing can be prevented, and since the CNG frequency/cadence check method is not changed at all, the CNG detection performance can also be prevented from being lowered in a situation in which the OGM is output onto the telephone line.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-032038 filed on Feb. 16, 2012, which is hereby incorporated by reference herein in its entirety.

What is claimed is:

1. A facsimile apparatus comprising:
   a connecting unit configured to connect a telephone;
   a tone detecting unit configured to detect, after the telephone captures a line, a tone signal on the captured line;
   a counting unit configured to count a number of the tone signals detected by the tone detecting unit;
   a controlling unit configured to control to start a facsimile reception, when the number counted by said counting unit reaches a predetermined number;
   a hook detecting unit configured to detect a change of a hook state of the telephone; and
   a resetting unit configured to reset the number of the tone signals counted by the counting unit, in accordance with detection of the change of the hook state of the telephone by the hook detecting unit.

2. The apparatus according to claim 1, further comprising:
   a judging unit configured to judge whether or not the tone signal detected by the tone detecting unit is a calling signal for the facsimile reception;
   wherein the counting unit counts the number of the tone signals judged by the judging unit as the calling signal.

3. The apparatus according to claim 2, wherein the judging unit judges that the tone signal detected by the tone detecting unit is the calling signal, when the tone signal continues for a predetermined period.

4. The apparatus according to claim 1, further comprising:
   a determining unit configured to determine whether or not the change of the hook state of the telephone detected by the hook detecting unit is caused by a pulse-dialing of the telephone;
   wherein the resetting unit resets the number of tone signals counted by the counting unit, when the determining unit determines that the change of the hook state of the telephone detected by the hook detecting unit is caused by the pulse-dialing of the telephone.

5. The apparatus according to claim 1, wherein the counting unit counts the number of the tone signals detected by the tone detecting unit, during the telephone performs an automatic answering.

6. A facsimile apparatus comprising:
   a connecting unit configured to connect a telephone;
   a tone detecting unit configured to detect, after the telephone captures a line, a tone signal on the captured line;
   a controlling unit configured to control to start a facsimile reception, when the tone detecting unit detects the tone signal;
   a hook detecting unit configured to detect a change of a hook state of the telephone; and
   a determining unit configured to determine whether the change of the hook state of the telephone detected by the hook detecting unit is caused by a pulse-dialing of the telephone,
   wherein the controlling unit does not control to start the facsimile reception, in a case where the determining unit determines that the change of the hook state of the telephone detected by the hook detecting unit is caused by the pulse-dialing of the telephone.

7. The apparatus according to claim 6, wherein the determining unit determines that the change of the hook state of the telephone detected by the hook detecting unit is not caused by the pulse-dialing of the telephone in a case where an on-hook state continues during a predetermined time, and
   wherein the determining unit determines that the change of the hook state of the telephone detected by the hook detecting unit is caused by the pulse-dialing of the telephone in a case where the on-hook state does not continue during the predetermined time.

8. The apparatus according to claim 6, wherein the controlling unit controls to start the facsimile reception, when the tone signal detected by the tone detecting unit is a calling signal for the facsimile reception.

9. The apparatus according to claim 6, wherein the tone detecting unit detects the tone signal, during the telephone performs an automatic answering.

10. A control method of a facsimile apparatus having a connecting unit configured to connect a telephone comprising:
    detecting, after the telephone captures a line, a tone signal on the captured line;
    counting a number of the detected tone signals;
    controlling to start a facsimile reception, when the counted number reaches a predetermined number;
    detecting a change of a hook state of the telephone; and
    resetting the counted number of the tone signals, in accordance with detection of the change of the hook state of the telephone.

11. A control method of a facsimile apparatus having a connecting unit configured to connect a telephone comprising:
    detecting, after the telephone captures a line, a tone signal on the captured line;
    controlling to start a facsimile reception, when the tone signal is detected;
    detecting a change of a hook state of the telephone; and
    determining whether the detected change of the hook state of the telephone is caused by a pulse-dialing of the telephone,
    wherein in a case where it is determined that the detected change of the hook state of the telephone is caused by the pulse-dialing of the telephone, the facsimile reception is not controlled to start.

12. A non-transitory computer readable storage medium storing a program for causing a computer to execute the method defined by claim 10.

13. A non-transitory computer readable storage medium storing a program for causing a computer to execute the method defined by claim 11.

* * * * *

UNITED STATES PATENT AND TRADEMARK OFFICE
CERTIFICATE OF CORRECTION

| | |
|---|---|
| PATENT NO. | : 9,060,073 B2 |
| APPLICATION NO. | : 13/761852 |
| DATED | : June 16, 2015 |
| INVENTOR(S) | : Yosui Naito |

It is certified that error appears in the above-identified patent and that said Letters Patent is hereby corrected as shown below:

On the Title Page at (73) Assignee, change "CANNON KABUSHIKI KAISHA, Tokyo (JP)" to
-- CANON KABUSHIKI KAISHA, Tokyo (JP) --

Signed and Sealed this
First Day of March, 2016

Michelle K. Lee
*Director of the United States Patent and Trademark Office*